May 29, 1956 — F. L. BUTTON — 2,747,451
UNIVERSAL DRIVING DOGS FOR LATHES AND MILLING MACHINES
Filed June 20, 1951 — 3 Sheets-Sheet 1

INVENTOR.
FRED L. BUTTON
BY
Charles A. Morton.
ATTORNEY

May 29, 1956   F. L. BUTTON   2,747,451
UNIVERSAL DRIVING DOGS FOR LATHES AND MILLING MACHINES
Filed June 20, 1951   3 Sheets-Sheet 2

INVENTOR.
FRED L. BUTTON
BY
Charles A. Morton.
ATTORNEY

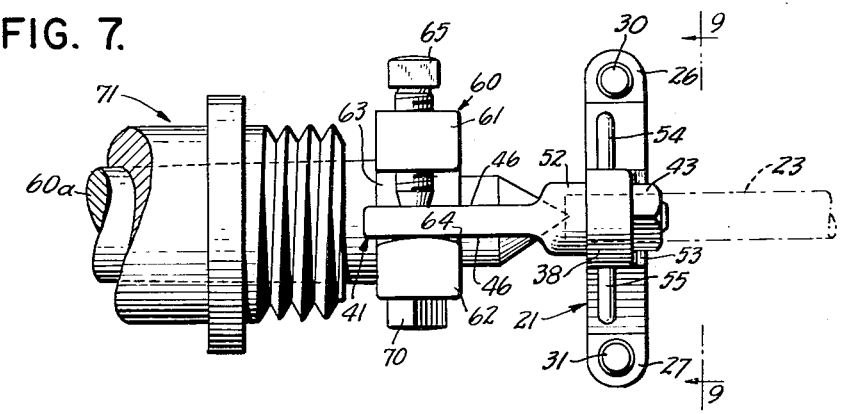
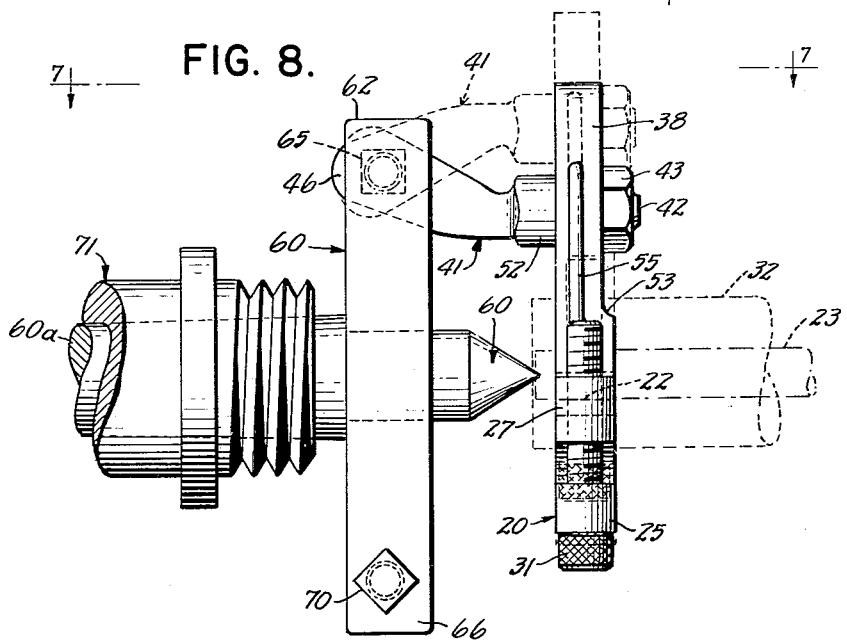
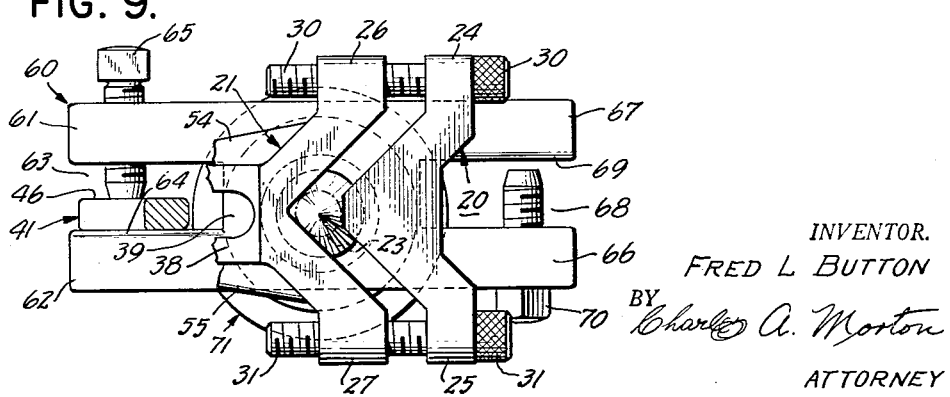
INVENTOR.
FRED L BUTTON
BY Charles A. Morton
ATTORNEY

United States Patent Office 2,747,451
Patented May 29, 1956

2,747,451

UNIVERSAL DRIVING DOGS FOR LATHES AND MILLING MACHINES

Fred L. Button, North Bergen, N. J., assignor, by direct and mesne assignments, of one-half to Charles A. Morton, Baldwin, N. Y.

Application June 20, 1951, Serial No. 232,549

1 Claim. (Cl. 82—41)

This invention relates to a universal driving dog for use on lathes, and milling machines. This application is a continuation in part of my copending application Serial No. 47,389, filed September 2, 1948, now abandoned.

One object of this invention is a simple, inexpensive driving dog which, by the mere reversal of one of its parts, can be used with large or small work.

Another object is a universal driving dog which is adjustable within wide limits so as to replace the series of dogs usually required for handling various sizes.

Another object is a universal driving dog which can be variously adjusted to a lathe plate and to milling machine centers.

Another object is an adjustable universal driving dog of but few and simple parts which is cheap and easy to manufacture, and which is very efficient and durable in use.

Another object is an adjustable driving dog which is substantially counterbalanced within certain limits of adjustment.

Another object is a driving dog which is adjustable to large or small work, and which is substantially counterbalanced when used on small work to permit high speed operation of the machine tool.

Other objects will appear from the detailed description which follows:

In the drawings comprising three sheets of nine figures numbered Figs. 1 to 9 inclusive:

Fig. 7 is a rear elevation of a forward fragment of the dividing head spindle of a milling machine showing my universal driving dog mounted upon the dividing head center of the milling machine taken along the line 7—7 of Fig. 8 looking in the direction of the arrows;

Figure 1:
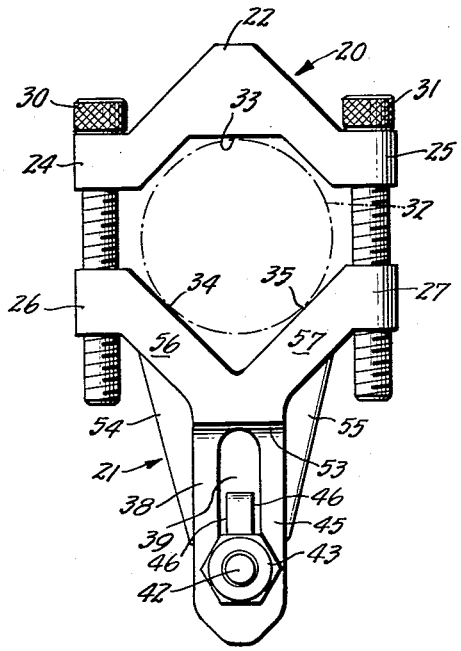
Fig. 1 is a front elevation of a universal driving dog constructed in accordance with this invention adjusted to drive large work, with the work shown in broken lines.

Fig. 8 is a plan view of the dividing head spindle and dividing head center of Fig. 7, showing in bold lines the relative positions of the several parts of my universal driving dog when adjusted to small work, the broken lines indicating the relative positions of the several parts of the dog when secured to large work; and Fig. 9 is a side view of the dividing head spindle and dividing head center of Fig. 7, taken along the line 9—9 of Fig. 7 looking in the direction of the arrows with the tail piece of my universal driving dog partially broken away.

Like reference characters designate corresponding parts throughout the several figures of the drawings.

Figure 2:
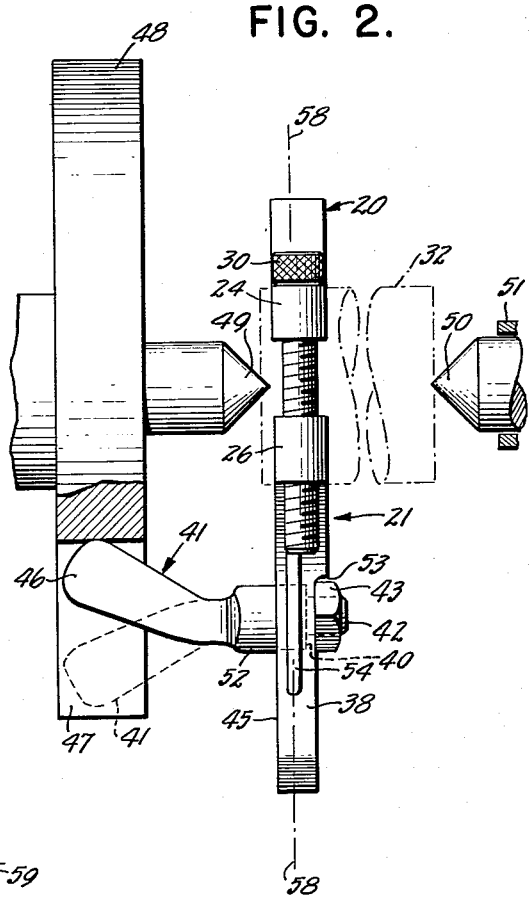
Fig. 2 is a side view of the universal driving dog of Fig. 1, associated with the dog plate of a lathe and showing the work in broken lines.
Figure 3:
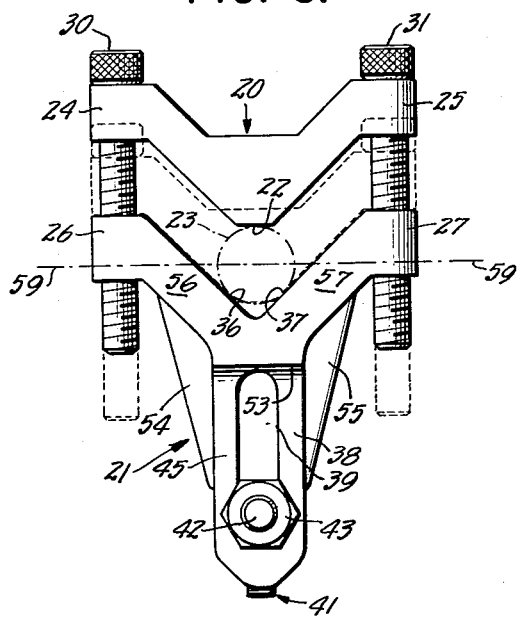
Fig. 3 is a front elevation similar to Fig. 1 with part of the driving dog reversed to show how the parts of the dog can be substantially counterbalanced when used for driving small work at high speed.
Figure 4:
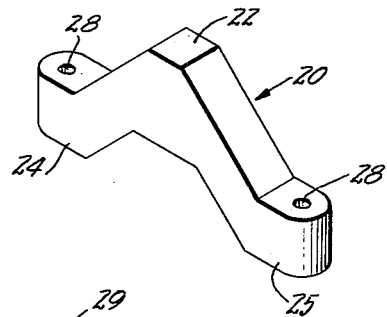
Figs. 4, 5 and 6 are detailed views of various elements of the driving dog.

The driving dog comprises two jaw members 20 and 21 which may be forged from tool steel, or die cast of any suitable material such as white metal for amateur use in the smaller sizes. The jaw member 20 (Fig. 4) is substantially A-shaped and when inverted is adapted, when positioned as shown in broken lines (Fig. 3), to nest between the forked arms defining the V-shaped portion of the Y-shaped jaw member 21 (Fig. 3). The central crown portion of jaw member 20 is flattened at 22, to form one of the clamping faces of the driving dog for clamping the small work (Fig. 3), when the jaw members 20 and 21 are drawn tight. When the jaw member 20 is in an upright position as shown in Figs. 1, 2 and 3, the flattened portion 22 lies in a horizontal plane.

Figure 5:
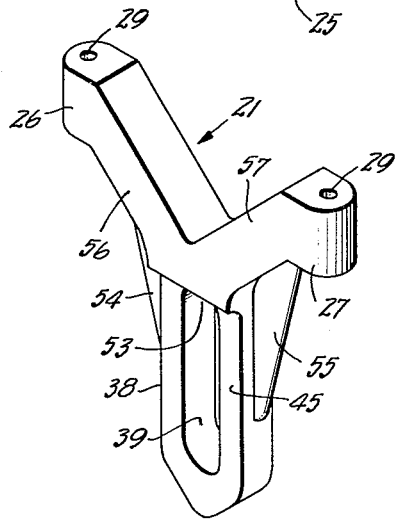

The oppositely disposed wing ends of the jaw member 20 project outwards to form the laterally projecting flanges 24 and 25. The winged ends of the jaw member 21 also project outwards to form the laterally projecting flanges 26 and 27. Each of the flanges 24 and 25 is drilled at 28 (Fig. 4), and each of the flanges 26 and 27 is drilled and tapped at 29 (Fig. 5), to accommodate the adjustable clamping screws 30 and 31 (Fig. 1), which for easy manipulation, and as shown, are preferably socket head cap screws. The holes 28 in the flanges 24 and 25 align with the tapped holes 29 in the flanges 26 and 27, so that when the jaw members 20 and 21 are brought into position of cooperative registry (Fig. 1 or 3), the clamping screws 30 and 31 pass through the holes 28 and screw into the threaded holes 29, and when the clamping screws 30 and 31 are drawn tight, the small work 23 (Fig. 3) or large work 32 (Fig. 1) will be clamped between the jaw members 20 and 21.

The jaw member 20 is reversible, so that by removing the clamping screws 30 and 31, the jaw member 20 may either be turned to opposed position as shown in Fig. 1 to accommodate the large work 32 which is tightly clamped between the jaw members 20 and 21 by means of the clamping screws 30 and 31, or the jaw member 20 may be inverted and reversed in the position shown in Fig. 3, to accommodate the small work 23 which is tightly clamped between the inverted jaw member 20 and the Y-shaped jaw member 21 by means of the clamping screws 30 and 31. When the driving dog is assembled as shown in Fig. 1, the large work 32 is clamped between at least three lines of contact 33, 34 and 35; when the driving dog is adjusted to accommodate the small work 23 (Fig. 3), the work 23 is secured in position by three lines of contact 22, 36, and 37. The clamping faces of each of the jaw members are flat, not bevelled, so that when the work is clamped between the jaw members, all points in each line of contact 33, 34, 35, or 22, 36, 37, engage the surface of the work.

Figure 6:
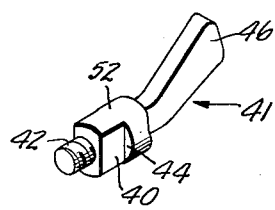

The Y-shaped jaw member 21 (Fig. 5) includes a shank 38 having an elongated channel 39 for slidably receiving the squared neck 40 of a tail piece 41 (Fig. 6). Tail piece 41 also includes a male threaded stud 42 for receiving a clamping nut 43, so that when the squared neck 40 of the tail piece 41 is mounted in the channel 39, the nut 43 may be tightened on the stud 42 to clamp the shoulder 44 of tail piece 41 against the opposite face 45 of the shank 38 (see Fig. 2). The side faces 46 of the tail piece 41 are flattened to allow the flattened end of the tail piece 41 to enter one of the slotted openings such as the opening 47 in the dog plate or head stock 48 of the lathe, so that when the work 32 (Fig. 2) or 23 (Fig. 3), is clamped between the jaws 20, 21 of the universal driving dog, and the work is freely rotatably mounted between the head stock center 49 carried by the head stock or dog plate 48 and tail stock center 50 carried in the tail stock 51, the tail piece 41 will engage in one of the slotted openings such as the slotted opening 47 in the dog plate or head stock 48 of the lathe, to drive the driving dog and the work 32 or 23 with the dog plate 48. The squared neck 40 of the hub 52 of tail piece 41 (Fig. 6) may be seated in the elongated channel 39, so that the tail piece 41 which is angular offset axially relative to the hub 52 may turn either inwardly, as shown in solid lines in Figs. 1 and 2, or outwardly, as shown in solid lines in Fig. 8. By loosening the clamping nut 43 the tail piece 41 may be adjusted in various positions along the shank 38, and by reversing the squared neck 40 in its seat in the elongated channel 39, the tail piece 41 may be turned either inwardly or outwardly (compare Figs. 2 and 8) to substantially increase the useful operating range of the driving dog. For example on very small work the tail piece may be positioned so close to the center of the work that it is necessary to turn the tail piece 41 outwardly to enable it to engage the slotted opening 47 of the dog plate 48, while on large work the tail piece 41 may be positioned so far from the center of the work and from the dog plate center 49, that it is necessary to turn the tail piece 41 inwardly to bring it near enough to the dog plate 48 to engage the slotted opening 47.

Figs. 7, 8 and 9 show the driving dog mounted in the dividing head centre 60 of a milling machine. The dividing head centre 60 is a substantially H-shaped tool, with a shank 60a (Fig. 7) tapered to frictionally engage the tapered socket of the driving head 71 of the milling machine. The dividing head centre 60 may be viewed as two yokes merged together to form the H-shaped tool (Fig. 9).

One of these yokes includes the yoke arms 61 and 62 (Fig. 9) with the slotted opening 63 positioned between them. The flattened end of the tail piece 41 will enter the slotted opening 63. The inner face 64 of the yoke arm 62 is curved or rounded (Fig. 7) and the flattened side face 46 of tail piece 41 is clamped against the rounded face 64 by the set screw 65 which is threadably mounted in the yoke arm 61 (Fig. 7). The other yoke includes the yoke arms 66 and 67 (Fig. 9) having the slotted opening 68 positioned between them for accommodating the flattened side faces 46, 46 of the tail piece 41. The inner face 69 of the arm 67 is rounded (Fig. 9) and the set screw 70 is threadably mounted in the yoke arm 66 to clamp the flattened side faces 46, 46 of the tail piece 41 between the set screw 70 and the curved face 69 of the yoke arm 67. The inner faces 64 and 69 of the yoke arms 62 and 67 are rounded off to avoid any tendency to throw the work out of alignment when the set screw 65 or 70 is set tightly enough to clamp the tail piece 41 against either of the yoke arms 62 or 67. Fig. 7 shows the flattened side faces 46, 46 of tail piece 41 clamped between the set screw 65 and the curved face 64 of the yoke arm 62.

By flattening the side faces 46, 46 of the tail piece 41, the set screw 65 or 70 may be screwed tight to clamp the tail piece 41 beneath the set screw and against either rounded face 64 or 69, without any risk of forcing the tail piece out of its correct position so as to disalign, and thus mar the cutting of, the work. If the work were thrown out of true, as for example, when cutting a gear, the gear teeth would not be cut true, and the work would be spoiled.

The dimensions of the dividing head centre 60 and the radial spacing of the set screws 65 and 70 vary on different makes of milling machines, and the work also varies in size as is best illustrated by way of example, by the small work 23 and the large work 32. To clamp work of various sizes it has been conventional shop practice to provide a series of dogs varying in size to accommodate the work. The conventional dog has a fixed tail piece which is not adjustable or reversible, and which may be either round or elliptical in cross section. A conventional dog can only be securely clamped in a dividing head centre when the tail piece is centered under the set screw 65 or 70 (Fig. 9). If the tail piece is not centered directly beneath the set screw, the set screw, when drawn tight, tends to move the tail piece off centre thus forcing the work out of correct alignment. If this displacement occurs while the work is being cut, it may be impossible to realign the work, or the work may be ruined before the displacement thereof is observed. When a conventional dog is secured to the work the tail piece frequently will not register beneath the set screw 65 or 70 and the machinist is obliged to bend the tail piece to position it beneath the set screw, thus consuming much time in setting up the work in the machine. Frequently the time consumed in adapting the dog to the machine greatly exceeds the time required to machine the work after it is correctly set up, thus greatly increasing the cost of production. My reversible, adjustable, angularly off-set flattened tail piece 41 can be readily manipulated until it is centered upon the curved face 64 or 69 exactly beneath the central axis of the set screw 65 or 70, so that when tension is applied to the set screw, the flattened faces 46, 46 are clamped between the set screw 65 or 70 and the crown of the rounded face 64 or 69 in the exact position selected, without throwing the work out of true, a result which obviously is not attainable with a conventional dog.

By providing a reversible jaw member 20 sized to nest precisely in the jaw member 21, a wide range of different sizes of shop work can be handled with but a single driving dog. By making the tail piece 41 adjustable along the shank 38, the work is quickly secured either to a lathe plate 48 (Fig. 2) or to a dividing head centre 60 (Fig. 8), while by off-setting the tail piece 41 axially and making it reversible in the elongated channel 39 the useful operating range of the driving dog is substantially increased. By flattening the side faces 46, 46 of the tail piece 41, the driving dog can be quickly and accurately aligned relative to the work and to either the dog plate of a lathe or to the dividing head centres of various sizes of milling machines, and the set screw can be drawn tight to secure the work in the machine without any risk of changing its setting. The flattened side faces 46, 46 prevent distortion when the tail piece 41 of the driving dog is locked to the dividing head centre 60 of a milling machine (Figs. 7, 8 and 9).

The shank 38 may be undercut at 53 so that the stud 42 and the clamping nut 43 need not protrude substantially beyond the face of the jaw member 21.

For home workshop (amateur) use, the jaw members may be die cast in any suitable metal, such as white metal in lieu of the steel forgings 20 and 21. The shank 38 of the jaw member 21 may be strengthened by the addition of side webs 54 and 55 extending between the opposite edge faces of the shank 38 and the corresponding edge faces of the arms 56 and 57 of the jaw member 21.

The mass of the jaw members 20 and 21 is so distributed relative to the transverse axis 59—59 of the driving dog when said dog is clamped to small work (Fig. 3) that the mass of the jaw members 20 and 21 positioned upon one side of the transverse axis 59—59 (Fig. 3) is substantially counterbalanced by the mass of jaw member 21, shank 38, and tail piece 41, positioned upon the opposite side of transverse axis 59—59, thus tending to prevent the driving dog from whipping when the work and dog revolve at high speed. Radial adjustment of the tail piece 41 by the in and out movement thereof along the shank 38, enhances the counterbalancing of the mass relative to the transverse axis 59—59 (Fig. 3). One simple way to adjust in counterbalance is to clamp the driving dog to the work with the tail piece 41 free, then spin the work between the lathe centers 49 and 50 (Fig. 2) and observe the position of rest when the work ceases to rotate. When the tail piece is so adjusted that the work comes to rest in any position, the parts of the driving dog are in counterbalance.

As the jaw members are moved apart to accommodate larger work, the counterbalance disappears, but as the size of the work 32 is increased the speed of rotation of the dog plate 48 and of the driving dog is reduced thus reducing the tendency to whip when the parts of the dirving dog are unbalanced. Thus a substantial counterbalance is obtained when smaller work is driven at high speed, while since larger work is driven at low speed, any tendency for the dog to whip on larger work is relatively unimportant.

My universal driving dog may for convenience be made of two different sizes, the smaller size of driving dog being suited for instrument and tool-room work, and the larger size of driving dog being adapted to handle all sizes of work normally handled in the average machine shop or tool-room. Either size of dog may be used for both high-speed and low-speed work. Thus any instrument or machine shop, or tool-room, equipped with one of my driving dogs, can conveniently and expeditiously handle any size of work normally handled by other shops of the same general class. For amateur or home use a die-cast driving dog with the reinforcing side webs 54, 55 is quite satisfactory, and can be mass produced and marketed at a relatively low price.

What is claimed is:

In a universal driving dog and in combination, two clamping members, each clamping member having two forked arms, means for adjustably securing said clamping members together to form a dog-assembly for clamping work between said forked arms, one of said clamping members being invertible and the forked arms thereof being sized to nest between the forked arms of the other clamping member, said clamping member when so inverted being adjustable to clamp smaller work between the clamping members of said dog-assembly, a shank extending radially outwards from the juncture of the forked arms of the other clamping member, said forked arms and said shank in conjunction being of Y-shaped configuration, a tail-piece reversibly mountable upon said shank and radially slidable therealong to adjustably secure the dog-assembly to the dog plate of a lathe or to the dividing head center of a milling machine to drive the dog and the work clamped in the dog, said tail-piece when mounted, projecting from the shank at an acute angle thereto so that said tail-piece will be inclined inwardly toward the centre of the dog plate or dividing head when mounted in one position upon said shank and outwardly away from the centre of a dog plate or dividing head when mounted in the reverse position upon said shank to increase the adjustment range of the tail-piece, said tail-piece having its oppositely disposed side faces flattened to insure that the work is aligned to rotate concentric with the axis of rotation of the dog plate or dividing head when the work is locked thereto, and said clamping members and said shank being so proportioned that when clamped to smaller work said members and said shank are substantially in counterbalance relative to the axis of rotation of the work, and the slidable adjustment of the tail-piece along said shank effecting closer counterbalance between the said members.

References Cited in the file of this patent
UNITED STATES PATENTS

| | | |
|---|---|---|
| 214,885 | Cloud | Apr. 29, 1879 |
| 612,332 | Grohmann | Oct. 11, 1898 |
| 1,012,967 | Barter | Dec. 26, 1911 |
| 1,087,369 | Haskell | Feb. 17, 1914 |
| 1,435,873 | Petersen | Nov. 14, 1922 |
| 2,092,997 | Wilson | Sept. 14, 1937 |
| 2,390,976 | Wilcox | Dec. 11, 1945 |
| 2,421,200 | Hall | May 27, 1947 |

FOREIGN PATENTS

| | | |
|---|---|---|
| 36,845 | Switzerland | Apr. 3, 1906 |

OTHER REFERENCES

"Grits and Grinds," vol. 36, Number 6, June 1945, page 12. Published by Norton Company, Worcester, Mass.